Patented June 15, 1926.

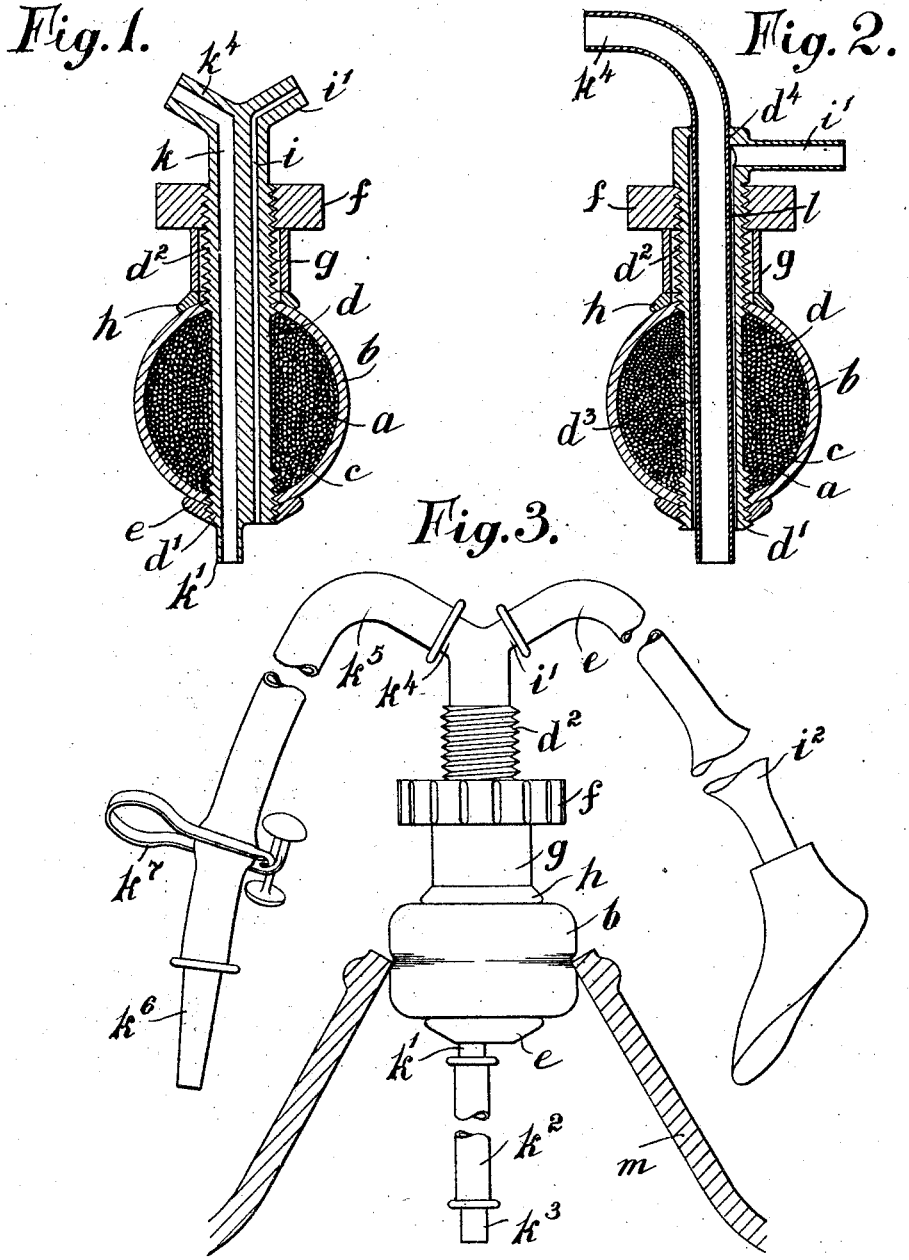

1,588,883

UNITED STATES PATENT OFFICE.

ERIC MAYLAND FRANCIS, OF LONDON, ENGLAND.

DEVICE FOR WITHDRAWING LIQUIDS FROM CONTAINERS.

Application filed September 18, 1923, Serial No. 663,332, and in Great Britain September 20, 1922.

The invention relates to an improved closure for liquid containers of the kind in which irregular shaped necks occur and provides a ready means for effecting a satisfactory seal.

The invention also contemplates a closure suitable for use with a device for withdrawing liquid from such containers and provides means whereby small quantities of corrosive liquid may be readily and easily withdrawn from the container thereof as required without risk or contamination, and without material damage to the device.

In the past when dealing with electrical storage batteries considerable difficulty has existed in connection with the withdrawal of small quantities of dilute sulphuric acid from the carboys within which it is usually stored.

According to this invention a closure is provided for the carboy or the like through which two conduits pass, one of the conduits being adapted to admit air to the space above the liquid whilst the other conduit is adapted to deliver the liquid externally.

The closure comprises compressible cellular elastic material enclosed within an impervious envelope such for example as sponge rubber within an india rubber envelope and means are provided for axially compressing the closure so as to increase its diameter and compel it to properly fit into and make a joint with the irregular neck of the carboy.

The closure is pierced with a hole adapted to form or enclose a conduit for the admission of air into the carboy and a hole adapted to enclose a conduit for the liquid or in part form a conduit for such liquid said conduit terminating internally below the level of the liquid and externally in a suitable delivery nozzle. The air conduit is externally connected to a source of pressure which may be produced by manually operated means or otherwise as desired and when liquid is to be withdrawn from the carboy the pressure may be temporarily increased or alternatively if the delivery nozzle is furnished with means to interrupt the flow as desired a suitable pressure may be maintained permanently within the said carboy.

In the drawings:—

Figure 1 illustrates one form of device constructed in acordance with this invention in sectional elevation.

Figure 2 is a sectional elevation of a modified form of device constructed in accordance with this invention.

Figure 3 illustrates the application of the device illustrated in Figure 1.

Referring to the drawings, the closure comprises a mass $a$ of resilient material enclosed within an impervious envelope $b$. In practice, it has been found that spongy rubber having a large number of air cells is particularly suitable for the resilient material whilst the impervious envelope can very well be made of india-rubber. The resilient material $a$ within the impervious envelope $b$ may be of spherical or any other convenient form and is provided with a central bore $c$, through which the stem $d$ of the device passes. The stem $d$ is provided with two threaded parts $d'$ and $d^2$; the threaded part $d'$ is adapted to receive a nut $e$ for maintaining the resilient material $a$ and its envelope $b$ in place. The threaded part $d^2$ is provided with a nut $f$ which is operated when it is required to laterally compress the resilient mass $a$, a spacing collar $g$ and washer $h$ being provided to enable comfortable operation to be effected. The stem $d$ as illustrated in Figure 1 is provided with two conduits $i$ and $k$ the conduit $i$ serving to admit air to the upper part of the container whilst the conduit $k$ is for the ejected acid to pass through. The conduit $k$ obviously will have to be in association with liquid even when only a small quantity of liquid is contained within the container, and consequently the conduit $k$ is continued as a pipe $k'$ of short length on to which is attached a flexible connection $k^2$ for example of rubber tube having a tubular weight $k^3$ at the end thereof adapted to ensure that the end of the flexible connection $k^2$ is always beneath the level of the liquid in the container.

The conduit $k$ at the part which is externally disposed when the device is in operation is formed as a tube $k^4$ of short length on to which a flexible connection $k^5$ having a directing jet $k^6$ and a pinch-cock $k^7$ is mounted. On the other hand, the conduit $i$ is extended as a short tube $i'$ adapted to receive a connection from a source of air or the like under pressure. As illustrated in Figure 3, an ordinary rubber bellows $i^2$ is diagrammatically illustrated by the broken parts shown.

Referring to Figure 2, a slightly modified construction is employed. In this case, the stem $d$ is provided with a single conduit $d^3$ within which is located a tube $l$, an annular passage being provided between the external surface of the tube $l$ and the internal surface of the conduit $d^3$. The tube $l$ is connected to the stem $d$ at the part $d^4$ in any suitable way so as to effect a rigid and airtight connection.

The annular space between the tube $l$ and the stem $d$ forms the air passage equivalent to the conduit $i$ in the construction illustrated in Figure 1, a tube $i'$ being arranged in connection with this annular passage. As in the construction illustrated in Figures 1 and 3, the connection with the air or the like under pressure is connected with $i'$, whilst the delivery of fluid is effected through the external part $k^4$ of the tube $l$.

In use, the device is inserted into the neck $m$ of the container from which the acid or the like is to be removed.

This invention particularly contemplates the extraction of acid from carboys and as it is well known, the upper edges of such necks are extremely jagged and irregular in shape and therefore great difficulties obtained in making the connection.

The closure forming the subject of the present invention is inserted into the aperture in the neck $m$ using such moderate degree of force as may be necessary. When the spherical part comprising the resilient material $a$ and impervious envelope $b$ is disposed within the upper surface of the neck $m$ so that a little more than one-half of the parts $a$, $b$ are disposed within the neck $m$, the nut $f$ is rotated and operates to laterally compress the envelope $b$ and its contents with the result that the perimeter of the sphere is increased and owing to its extremely elastic form it readily makes a proper joint with the neck $m$ of the carboy.

When sulphuric acid is being extracted from a carboy it has been found that an efficient device is produced if the parts in contact with the acid are made of antimonial lead and that further very efficient operation can be obtained if the nut $f$ is constructed of ebonite or like material.

When other corrosive liquids are being dealt with, then the material of which the parts in contact therewith are constructed will have to be modified to obviate the destruction of said parts by said liquids.

Obviously, although rubber bellows $i^2$ have been referred to and illustrated for purposes of explanation means may be provided to produce increased pressure upon the upper surface of the liquid contained in the carboy in a permanent way so that at any time acid may be withdrawn from the carboy through the jet $k^6$ by manipulation of the pinch-cock $k^7$ or any equivalent controlling device employed for that purpose. In some cases an annular rib or bead may be formed on or attached to the impervious envelope as a belt at that part located immediately below the line of contact with the neck of the container.

I claim:

1. A closure for liquid containers, having in combination an impervious envelope with a filling of compressible cellular elastic material and means for axially compressing the envelope and its filling to increase the transverse diameter thereof.

2. A closure for liquid containers, having in combination, an impervious envelope with a filling of sponge rubber, a passage through said envelope and its filling, a stem located in said passage, a collar on said stem to prevent movement of a part of said envelope in one direction, a thread on part of said stem, and a nut on said threaded part for axially compressing the envelope and its filling to increase the transverse diameter thereof.

3. A closure for liquid containers, having in combination, an impervious envelope with a filling of sponge rubber, a passage through said envelope and its filling, a stem located in said passage, conduits in said stem, a collar on said stem to prevent movement of a part of said envelope in one direction, a thread on part of said stem, and a nut on said threaded part for axially compressing the envelope and its filling to increase the transverse diameter thereof.

In testimony whereof I have signed my name to this specification.

ERIC MAYLAND FRANCIS.